(12) United States Patent  
Hine (10) Patent No.: US 9,260,044 B1  
(45) Date of Patent: Feb. 16, 2016

(54) AUTOMATED MATERIAL UNLOADER

(76) Inventor: Joseph Hine, Southbury, CT (US)

( * ) Notice: Subject to any disclaimer, the term of this patent is extended or adjusted under 35 U.S.C. 154(b) by 1127 days.

(21) Appl. No.: 13/098,644

(22) Filed: May 2, 2011

Related U.S. Application Data

(63) Continuation-in-part of application No. 11/789,529, filed on Apr. 25, 2007, now Pat. No. 7,959,397.

(51) Int. Cl.
  *B60P 1/00* (2006.01)
  *B60P 1/36* (2006.01)
  *B65G 67/24* (2006.01)

(52) U.S. Cl.
  CPC .. *B60P 1/36* (2013.01); *B65G 67/24* (2013.01)

(58) Field of Classification Search
  CPC .... B65G 41/008; B65G 41/005; B65G 65/28; B65G 41/002; B65G 21/14; B65G 21/10; B65G 15/26; B65G 67/08; B65G 65/00; B65G 3/02; B65G 25/065; B65G 37/00; A01D 51/005; A01D 34/63; A01D 90/08; B65B 21/22; B65B 69/0033; B65F 3/18; B65F 3/202; E01H 1/047; B60P 1/36; B60P 1/40; B60P 1/16; B60P 1/38; B60P 1/42; B60P 3/1075; B60P 3/122; B60P 3/07; B60P 3/08; B60P 1/4414; B60P 1/445; E01C 19/203; A01B 45/04; A01C 3/06; E01F 9/014; B66F 9/07563; B62B 5/0003; B62B 3/148; B65D 90/046; B61D 3/20; B61D 3/18; A61G 3/06
  USPC ......... 414/418, 488, 489, 507, 467, 353, 556; 198/312, 313, 314, 315
  See application file for complete search history.

(56) References Cited

U.S. PATENT DOCUMENTS

| | | | |
|---|---|---|---|
| 2,419,824 A | 4/1947 | Davis | |
| 2,879,910 A | * 3/1959 | Johnson | 414/489 |
| 3,429,418 A | 2/1969 | Fyrk et al. | |
| 3,583,645 A | 6/1971 | Murray et al. | |
| 3,788,452 A | * 1/1974 | McWilliams | 198/313 |
| 3,866,769 A | 2/1975 | Morey et al. | |
| 3,963,138 A | 6/1976 | Fowler | |
| 4,043,446 A | 8/1977 | Tarrant | |
| 4,265,579 A | 5/1981 | Naruns et al. | |
| 4,326,673 A | 4/1982 | Thene | |
| 4,373,845 A | 2/1983 | Henke | |
| 4,583,693 A | 4/1986 | Harder | |
| 4,629,390 A | 12/1986 | Burke | |
| 4,784,563 A | 11/1988 | Esh et al. | |
| 4,813,839 A | 3/1989 | Compton | |
| 5,035,534 A | 7/1991 | Brock et al. | |
| 5,044,867 A | 9/1991 | Pettijohn | |
| 5,400,897 A | 3/1995 | Doyle | |
| 5,402,874 A | 4/1995 | Dahlin et al. | |

(Continued)

*Primary Examiner* — Saul Rodriguez
*Assistant Examiner* — Glenn Myers
(74) *Attorney, Agent, or Firm* — Bay State IP, LLC (57) ABSTRACT

The invention is a material unloader having an automatic hydraulic mechanism and frame for removably securing underneath a body of a dump truck. The mechanism has a support platform having two channels and two coupling means. The frame has a platform, a pair of longitudinal flanges coupled together by a stabilizing bracket, a plurality of cross-braces extending therebetween, and an outside surface having a plurality of rollers which are accepted into the channels of the mechanism for automatic actuation. The platform of the frame supports a chain driven conveyor assembly including an endless drive mechanism having a pair of parallel drive chains.

15 Claims, 8 Drawing Sheets

(56) References Cited

U.S. PATENT DOCUMENTS

| | | | |
|---|---|---|---|
| 5,470,175 A * | 11/1995 | Jensen et al. | 404/72 |
| 5,525,025 A * | 6/1996 | Ootmar Ten Cate et al. | 414/529 |
| 5,669,562 A * | 9/1997 | Smith | 241/101.74 |
| 5,819,950 A | 10/1998 | McCloskey | |
| 5,873,396 A | 2/1999 | Biebrach et al. | |
| 5,927,617 A | 7/1999 | Musso et al. | |
| 6,006,893 A | 12/1999 | Gilmore et al. | |
| 6,033,179 A | 3/2000 | Abbott | |
| 6,394,735 B2 | 5/2002 | Hollinrake et al. | |
| 6,698,997 B2 * | 3/2004 | Arne et al. | 414/502 |
| 6,960,055 B2 * | 11/2005 | Musso et al. | 414/528 |
| 7,090,066 B2 | 8/2006 | Kirsch | |
| 7,108,125 B2 * | 9/2006 | Gilmore et al. | 198/812 |
| 2001/0001637 A1 | 5/2001 | Zanzig | |

* cited by examiner

AUTOMATED MATERIAL UNLOADER

CROSS REFERENCES AND RELATED SUBJECT MATTER

This application is a continuation-in-part of patent application Ser. No. 11/789,529, filed in the United States Patent Office on Apr. 25, 2007 now U.S. Pat. No. 7,959,397.

BACKGROUND OF THE INVENTION

1. Field of the Invention

The invention generally relates to conveyers, and more specifically, to an automated material unloader positionable horizontally underneath a bed of a dump truck for transporting material within the bed to a dump site using a chain driven conveyor assembly powered by a hydraulic fluid system.

Truck transportation holds an important place in commerce. Private businesses and individuals contract with trucking and warehousing companies to pick up, transport, store, and deliver a variety of goods. Public works trucks undertake the tasks of loading and unloading various types of materials like snow from plowed roads, asphalt for repairing and paving roads, soil for city gardening, and garbage for transport to dumpsters. As a result, cities and towns rely heavily on the efficient unloading of materials from trucks because most projects are taxpayer funded, and therefore bottom line costs are in the public eye.

Specifically, unloading a dump truck is no easy task. A dump truck unloads its contents, usually loose material, by tilting its bed backward. The gate at the rear of the truck's bed must be manually opened and allow gravity to pull the material downward onto the ground directly behind the truck. However, often times a large portion of material gets stuck in the bed of the truck, requiring a person to jump into the bed and physically shovel-out the remaining material. The exhausting task of unloading large quantities of material is not something workers are fond of, especially when the material is heavy or when temperatures reach extreme highs and lows. More importantly, shoveling material from a truck's bed puts physical strain on workers' bodies, placing them at risk of serious physical injuries such as lower back sprains and broken bones. Furthermore, the exhaustion caused by unloading trucks leads to reduced production by workers who cannot work as efficiently when fatigued.

Currently, when material is unloaded from a dump truck, the placement of the load is limited to directly behind the bed of the truck where it must be shoveled or moved to the desired location. This area is hard for a truck driver to see even with the assistance of rearview mirrors. The present invention feeds material directly to the desired locations, thereby solving this problem.

Therefore, there is a need for an unloading mechanism which facilitates the unloading of loose material from trucks, which does not require a worker to shovel loose material from the truck's bed, which eliminates injuries associated with shoveling, which increases time efficiency of unloading material from a truck, which reduces the manpower needed to unload material from a truck, which may be used over and over yet requires no maintenance, and can dump material from the side of a truck.

2. Description of the Related Art

U.S. Pat. No. 3,583,645 to Murray et. al, discloses a material spreader for a dump truck is pivotally attached to the rear of the truck body in a normally fixed position and has a transverse bar flight conveyor and a spinner assembly which is self-leveling. The truck tailgate forms an end wall when truck is used for spreading material and has side shields to contain such material. A cover for the conveyor in the closed position provides a smooth surface to permit the truck to be used for conventional hauling, dumping, etc. and in an open position is attachable to the end gate to uncover the conveyor. A pressure plate on the cover operates an indicator in the cab to signal when the spreader needs more material.

U.S. Pat. No. 5,819,950 to McCloskey discloses a portable trammel has a chassis, including support wheels at one end thereof for movement of the trammel. A trammel is rotatably mounted on the chassis and has, an input and an output end. A hopper and an input conveyor, for supplying material to be screened to the input end of the trammel, are mounted on the chassis adjacent the input end of the trammel. An output or fines conveyor, for collecting material passing through the trammel screen is mounted on the chassis, below the trammel. A stockpiling conveyor is mounted on the chassis and has a lower end adapted receive screened material from the fines conveyor and an upper end for discharging screened material to form a stockpile. The stockpiling conveyor can be in two parts, which can be folded into a retracted position for storage and transportation, and further can be mounted for rotation about a vertical axis to enable an arcuate storage pile to be formed.

U.S. Pat. No. 5,400,897 to Doyle discloses a conveyor for transferring loose bulk material, such as fertilizer and the like, in a manner which minimizes the creation of airborne dust includes structure for movably supporting the material to be transferred, structure for automatically cleaning the movable support during movement of material thereon and for causing the structure for movably supporting the material to be transferred to move.

U.S. Patent App. No 20010001637 to Zanzig, discloses a refuse collection vehicle including a collection towing vehicle having a refuse loading mechanism for loading a semi-trailer coupled to a fifth wheel, the semi-trailer having a refuse collection body for receiving refuse from the refuse loading mechanism and a hoist mechanism for tilting the refuse collection body. The refuse collection system also includes a refuse transport vehicle which includes a transport towing vehicle having a fifth wheel for receiving a semi-trailer, and a dolly which may be coupled to the semi-trailer for towing additional semi-trailers. A control assembly is coupled to the refuse collection vehicle and the transport towing vehicle including the dolly, having control couplings for interconnection of control assemblies and control umbilicals for providing control to the various devices.

U.S. Pat. No. 4,265,579 to Naruns, discloses a bulk material unloader in which a clamshell bucket is suspended from a boom which is luffed from a position over the material to be unloaded through the vertical to a position over a bulk material receiving hopper. The hoists and/or the anchors for the bucket hold and close ropes are mounted on the unloader base on the opposite side of the hopper from the boom pivot such that the suspended length of the hold and close ropes is increased as the boom is luffed through the vertical and the bucket is thereby lowered into the hopper with the hoists remaining inactive until the bucket is in position to be opened and discharged with minimum dusting effect.

U.S. Pat. No. 4,784,563 to Esh, et al. discloses an unloader for an unmodified dump truck which uses a temporarily installed conveyor along the flat bottom to dispense materials. Two struts of angle iron extend out from the conveyor to the bin sides and are pressed against the sides by threaded fittings. The struts hold the end of the conveyor in place, but permit simple and quick installation and removal.

U.S. Pat. No. 3,866,769 to Morey, et al. discloses a system for handling wood chips wherein an unloader vehicle unloads the chips from a truck trailer or the like to a transfer vehicle, adapted to be positioned, adjacent the trailer, and having a roadway on which the unloader vehicle travels as it moves in a to-and-fro path of travel to and from the trailer. The roadway is provided with a grid which supports the unloader vehicle and includes openings therein of such size as to pass free-falling chips deposited by the unloader vehicle. A chip receiving conveyor mechanism is disposed below the grid for receiving the chips and conveying them to the opposite end of the vehicle where they are transferred to a blower which provides a high velocity airstream to carry the chips to, and pile them at, a remote location.

U.S. Pat. No. 6,394,735 to Hollinrake, et al. discloses a vehicle including a combination body for selectively dumping and spreading materials. The vehicle includes, at least, a chassis and a body pivotably secured to the chassis at a hinge. The body is comprised of front and rear ends having upper and lower edges and first and second side walls having lower edges. A hoist is provided which extends between the body and the chassis for pivoting the body about the hinge. A conveyor assembly is also included, the assembly comprising an endless conveyor disposed adjacent to at least a portion of the lower edges of the side walls and extending beyond the rear end of the body; a tailgate pivotably connected to the rear end of the body and having an opening therein to permit material to be transported therethrough by the endless conveyor, the tailgate being selectively pivotable with respect to the body about a lower axis disposed adjacent the lower edge of the tailgate or about an upper axis disposed adjacent the top edge of the tailgate; a cover assembly extending rearwardly from the tailgate which is pivotably attached to the tailgate at a pivot axis, wherein the cover assembly rotates about the pivot axis upon contact with the conveyor assembly when the tailgate pivots about the lower axis; and a spreader cooperating with the conveyor assembly for spreading the material.

U.S. Pat. No. 6,033,179 to Abbott, discloses a clean-out apparatus for use in a trailer of the type having a reciprocating floor conveyor system for conveying and unloading large quantities of granular material. The clean-out apparatus is designed to minimize the residual granular material that remains on the reciprocating floor of the truck after the floor is reciprocated to unload the granular material. The clean-out apparatus comprises a reel adapted for rotatable support from the trailer, adjacent the forward end wall thereof, and a flexible clean-out cover movable from a first retracted, position where it is coiled around the reel to a second uncoiled extended position adjacent the rear door opening. Importantly, when the clean-out cover is in the first retracted position, it is disposed such that a portion thereof extends over the reciprocating floor, under a portion of the granular material adjacent the forward end wall of the trailer. With this arrangement, the clean-out cover moves from the first retracted position to the second extended position responsive to frictional engagement with the reciprocating floor as the same is reciprocated to convey the granular material rearward through the rear door opening. Conversely, the clean-out cover is movable from the second extended position to the first retracted position responsive to rotation of the reel following the unloading of the granular material.

U.S. Pat. No. 4,326,673 to Thene, discloses an aggregate distributor on the rear of a truck dump box including an elongate housing extending transversely across the end of the truck and having a multiplicity of discharge ports through which the aggregate is dropped onto spinners swingably suspended from the distributor housing, a square tubular rotary shaft in the housing carrying conveying, mixing and agitating vanes which are rotationally adjustable on the shaft to cause aggregate to be propelled along the shaft in various directions, in accordance with the discharge ports that are open.

U.S. Pat. No. 4,629,390 to Burke, discloses a device which unloads materials from a vehicle cargo area such as the bed of a pickup truck. A pair of mounting brackets are bolted to opposite sides of the vehicle bed. Pivoted to the brackets are the front ends of rigid frame arms which carry a rotatable drum between their back ends. A flexible conveyor sheet is wound on the drum and can be unwound onto the vehicle bed to receive materials loaded therein. A motor driven or manually operated drive system rotates the drum to unload the cargo as the conveyor sheet is wound up on the drum. The pivotal mounting of the frame arms permits them to be raised with the tailgate of the vehicle to a storage position during transport of the load.

U.S. Pat. No. 6,006,893 to Gilmore, et al., discloses an extendable trailer for loading and unloading items from a truck trailer, or other type of transportation unit, includes a user interface section. The user interface section is cantilever supported and both longitudinally and horizontally movable. The user interface section is attached to a mechanically extendable section that includes a conveying surface separate from the conveying surface of the user interface section. The user interface section may be vertically pivotable and may include a locking system which allows longitudinal movement of the user interface section only when the mechanically extendable section is in a fully retracted position. A cable retracting unit is positioned on the mechanically extendable section adjacent the user interface section and takes up slack in the power cable supplying power to the user interface section.

U.S. Pat. No. 5,402,874 to Dahlin, et al., discloses a conveyor coupled to a skid motor vehicle operates to unload bulk granular material from a railroad hopper car. The conveyor has an obtuse configured frame supporting an endless belt extended about an idler roller and a driven roller. A hydraulic motor mounted on the frame supplied with hydraulic fluid under pressure from the hydraulic system of the motor vehicle rotates the drive roller thereby moving the belt relative to the frame and mount thereon. A pair of transverse tubular box members are secured to the bottom of the frame to accommodate forks attached to the skid motor vehicle whereby the skid motor vehicle can lift the conveyor and transport it to another location.

U.S. Pat. No. 4,373,845 to Henke, discloses a material transport and self-unloading vehicle having an open top hopper for accommodating bulk material, as animal feeds. A first material conveying auger is located along the bottom of the hopper for moving material toward a side discharge opening in the hopper. A second paddle auger is located above the first auger for moving material rearwardly in the hopper. A side unloading conveyor mounted on the side of the hopper adjacent the side discharge opening operates to receive material moved through the discharge opening by the first auger and move the material laterally of the hopper to a discharge or feeding location. A drive assembly drivably connects a power take-off drive shaft to the first and second augers and unloading conveyor for concurrent operation of the augers and unloading conveyor. The bottom wall of the hopper has a curved section extended contiguously around the leading section of the flights of the first auger and a linear bend or break line located adjacent the leading side of the first auger in a horizontal plane that generally intersects the axis of rotation of the first auger.

U.S. Pat. No. 4,813,839 to Compton, discloses a portable self-powered load conveyer is structured on a wheeled frame with a drive-over ramp feature allowing ground level loading of bulk materials. Pivotally attached to the wheeled frame, is an elevator with height adjustment mechanics for depositing the bulk materials as required at a higher level. The wheeled frame is equipped with retractable street wheels and a tow hitch for moving the conveyer from job site to job site by towing. Dual sets of positionable wheels, also on the frame, allows backward, forward, turning, and sideways self-powered movement of the conveyer assemblage around the job site. The self-powering is accomplished by an installed internal combustion engine and controlled hydraulic pressurized mechanics. The control arrangement allows for the entire conveyer assemblage to be managed by a single operator.

U.S. Pat. No. 7,090,066 to Kirsch, discloses a new grain unloading system using an integrated ramp, horizontal transfer conveyor and elevating system. The unit is towed, positioned and powered by an agricultural tractor.

SUMMARY OF THE INVENTION

It is an object of the invention to provide an improved means for unloading material from a dump truck directly to a dump site. Accordingly, the invention is automated material unloader which collects material from a bed of a truck and using a chain driven conveyor assembly transports the material directly to the dump site.

It is another object of the invention to provide an unloader capable of securing underneath a bed of the dump truck for transporting without hazard from one dump site to another. Accordingly, the unloader of the invention has an automatic hydraulic mechanism having at least two channels underneath the bed of the dump truck wherein the unloader secures therein during transport.

It is another object of the invention to provide an unloader which automatically extends outwardly from the dump truck and retracts underneath the dump truck when not in use. Accordingly, the automatic hydraulic mechanism of the present invention has a hydraulic cylinder operated by an activation switch which actuates a plurality of rollers coupled to the unloader thereby allowing the unloader to automatically extend outwardly from the dump truck and into position for use and retract underneath the dump truck when not in use. At least two bumper stops are on the channels for preventing the unloader from completely extending outwardly and dislodging from the dump truck and causing hazardous road conditions while in use.

It is another object of the invention to provide an unloader suitable for collecting material discarded from the dump truck. Accordingly, the present invention includes a back plate and inclined side walls for catching excess material that may spill from the platform as material is carried along the chain driven conveyor assembly.

It is another object of the invention to provide an unloader that is powered by a dump truck. Accordingly, the unloader of the present invention, including the conveyor assembly and automatic hydraulic, mechanism, is easily connected by hydraulic lines to the hydraulic fluid system of the dump truck, such that the hydraulic fluid system of the dump truck easily powers the unloader.

It is yet another object of the invention to provide an unloader that is easy to use, suitable for multiple applications, cost effective, eliminates injury associated with shoveling, and increases time efficiency.

It is yet another object of the invention to provide an unloader that unloads material in a dump truck more safely and in confined spaces. Accordingly, the unloader of the present invention unloads material in a dump truck without raising the bed thereby maintaining a low center of gravity and reducing the risk of tipping over. The truck may be used in areas with low clearance due to trees, power lines, overpasses, and garage ceilings.

The invention is a material unloader having an automatic hydraulic mechanism and frame for removably securing underneath a body of a dump truck. The mechanism has a support platform having two channels and two coupling means. The frame has a platform, a pair of longitudinal flanges coupled together by a stabilizing bracket, a plurality of cross-braces extending therebetween, and an outside surface having a plurality of rollers which are accepted into the channels of the mechanism for automatic actuation. The platform of the frame supports a chain driven conveyor assembly including an endless drive mechanism having a pair of parallel drive chains. The assembly includes a lower end located about a pair of drive sprockets secured to a transverse drive shaft, and an upper end trained about idler sprockets mounted on a traverse shaft. The unloader has a power train including a hydraulic motor, a gearbox and a driveshaft.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
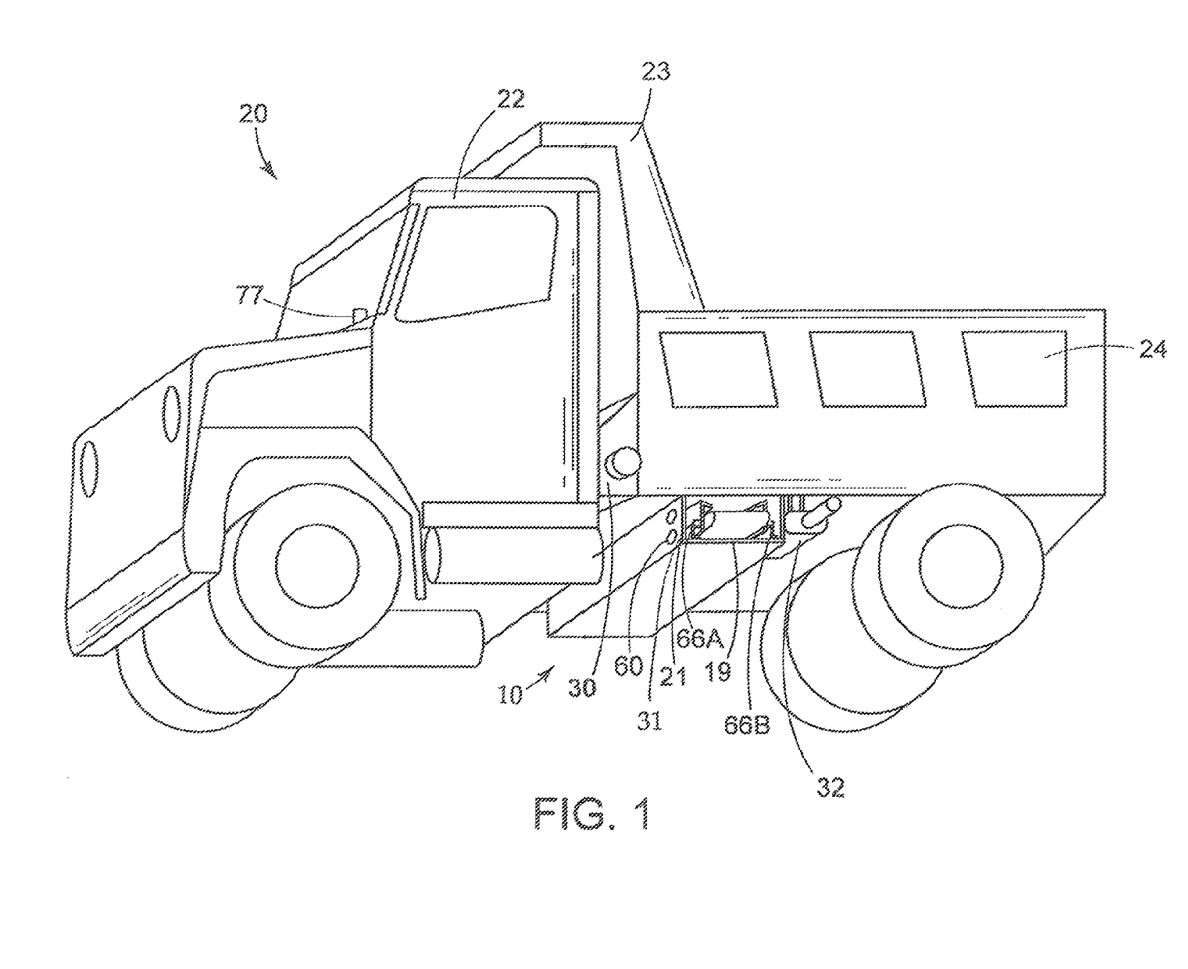
FIG. 1 is a diagrammatic perspective view of an automated material unloader of the present invention secured underneath a dump truck.

FIG. 1 illustrates an automated, material unloader 10 of the present invention. Preferably, the unloader 10 is an automated mechanical system that integrally couples underneath a body 22 of a dump truck 20. The unloader 10 is capable of unloading material transported by the dump truck 20 more safely and within confined spaces. Negating the need to raise the bed, the dump truck 20 maintains a lower center of gravity thereby reducing the risk of tipping over while unloading material located within the body 22 of the dump truck 20. The dump truck 20 is suitable in areas with low clearance, such as around trees, power lines, under bridges, and inside garages. In the preferred embodiment, the unloader 10 is integrally coupled underneath the body 22 of a side winder dump truck 20 most commonly used to transport asphalt or topsoil. In its broadest context, the unloader 10 includes a frame 40, an automatic hydraulic mechanism 64, a chain driven conveyor assembly 70, and a power train 90.

As shown in FIG. 1, the unloader 10 is positioned underneath the body 22 of the dump truck 20 when transporting material to a dump site. In the preferred embodiment, the automatic hydraulic mechanism 64 includes a support platform 19 which extends underneath the body 22 of the truck 20, and is held in position by at least two coupling means 21. Preferably, the coupling means 21 are integrally coupled vertical support beams which support the unloader 10 suspended underneath the body 22 of the dump truck 20. At least two channels 66 integrally couple underneath to the support platforms 19. Preferably the two channels 66, including a front channel 66A and a back channel 66B, secure the frame 40 to the support platform 19 underneath the dump truck 20. The front and back channels 66A, 66B allow the frame 40 to automatically extend outwardly from the underneath the body 22 of the truck 20 into position for use. Similarly, the front and back channels 66A, 66B allow the frame 40 to easily retract back underneath the dump truck 20 when no longer in use and during transport. Preferably, the front channel 66A is a U-shaped channel, while the back channel 66B is a Z-shaped channel which allows the frame 40 to lock in position therein.

Figure 2:
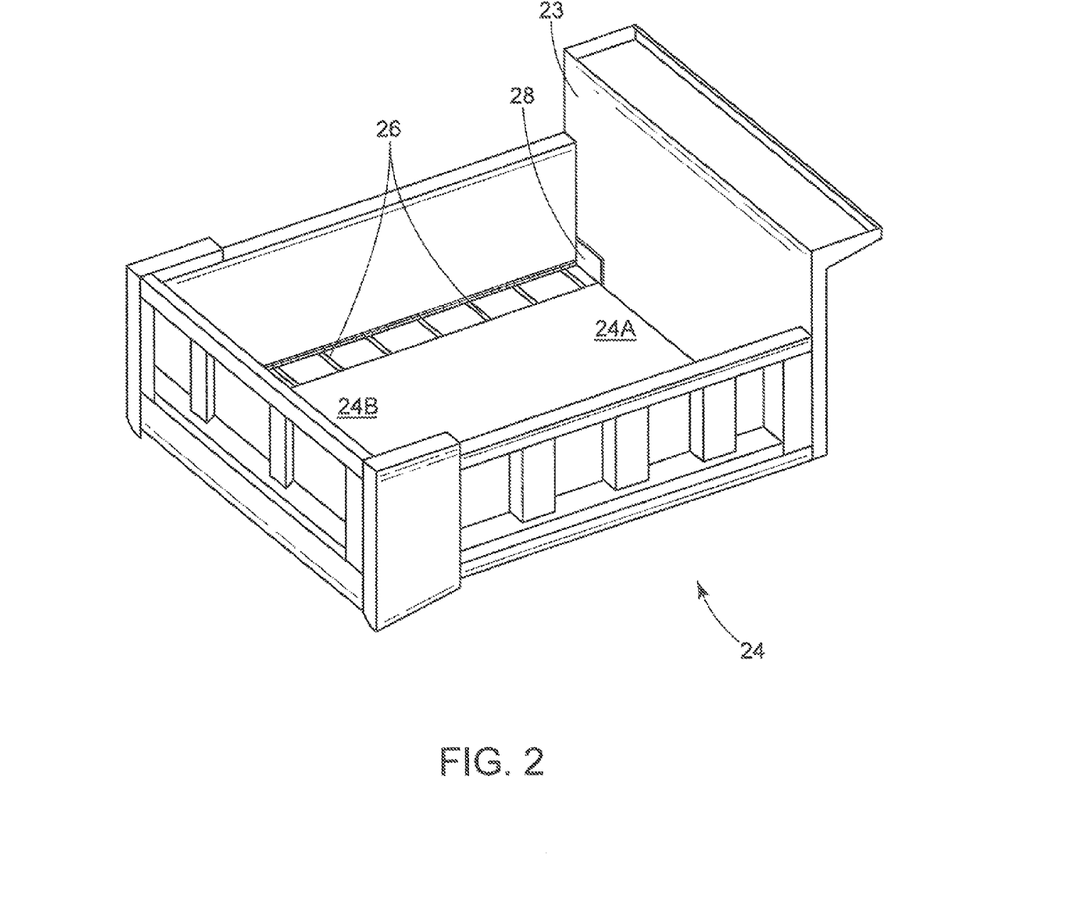
FIG. 2 is a diagrammatic perspective view of a bed of a dump truck to which the automated material unloader of the present invention is integrally attached, said bed including a conveyor assembly.
Figure 3:
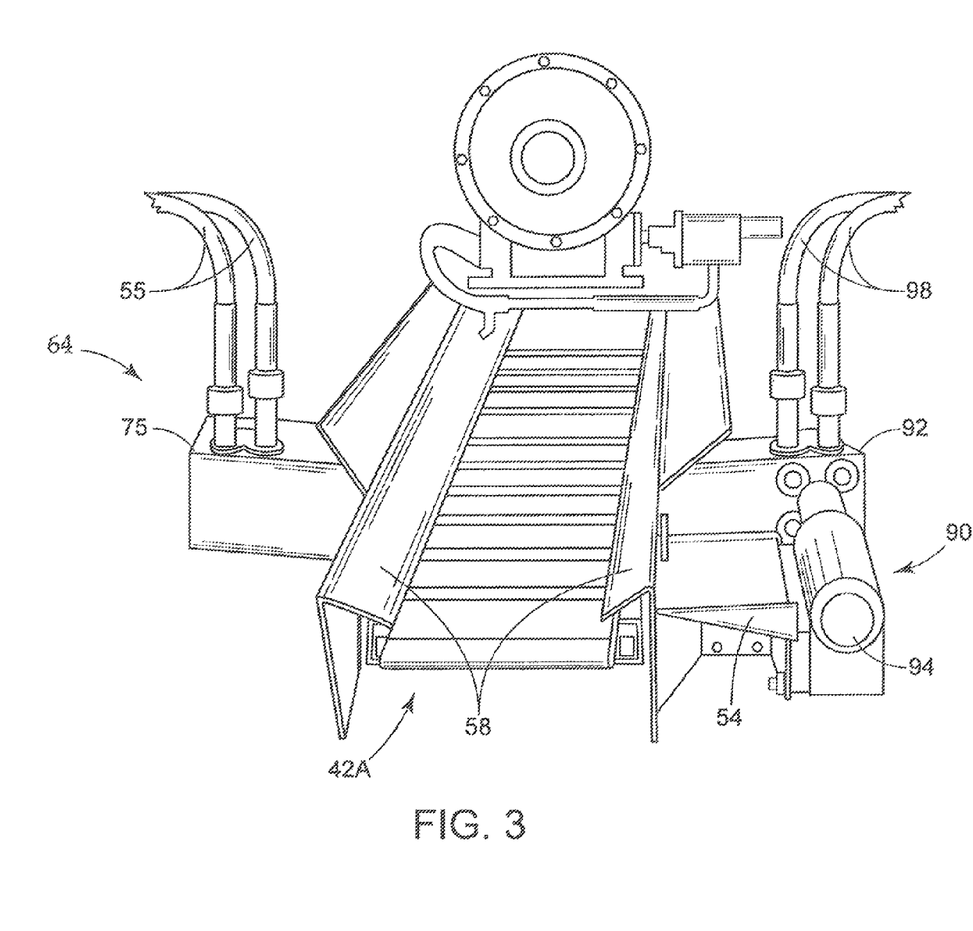
FIG. 3 is a diagrammatic perspective view of the automated material unloader of the present invention, having a chain driven conveyor system, powered by a hydraulic motor, a driveshaft and a gearbox.

As shown in FIG. 2, the dump truck 20 has a bed 24 having a front end 24A and a back end 24B. A conveyor assembly 26 extends from the front end 24A to the back end 24B and is utilized to move material from within the truck 20 to the dump site. A hole 28 is positionable above a spout 30 along the front end 24A of the bed 24 for allowing material to drop down from the conveyor assembly 26 of the body 22 of the dump truck 20 to the unloader 10. The dump truck 20 includes a standard hydraulic fluid system 32, which produces pressure to operate accessories attachable to the dump truck 20, including but not limited to, the conveyor assembly 26 and automatic hydraulic mechanism 64. The hydraulic fluid system 32 of the dump truck 20 is utilized to power the unloader 10 of present invention, including the conveyor assembly 26 and automatic hydraulic mechanism 64.

FIGS. 3-6 illustrate the unloader 10. In the preferred embodiment, the unloader 10 is twenty four inches (24") in width, eight and one-half feet (8.5°) in length and ten inches (10") in height. The frame 40 of the unloader 10 has an outside surface 40A, which supports a platform 42, having a distal end 42A. The frame 40 has a pair of longitudinal flanges 44 having a distal edge 41 which couple the frame 40 to the dump truck 20. In particular, a plurality of rollers 68 are coupled to the outside surface 40A of the frame 40 along the length of each of the two distal edges 41. The rollers 68 moveably secure the frame 40 of the unloader 10 within the channels 66 of the automatic hydraulic mechanism 64 fixed to the support platform 19 underneath the body 22 of the dump truck 20. The rollers 68 are accepted within the front and back channels 66A, 66B and allow the unloader 10 to alternate between extending outwardly from underneath the truck while in use and retracting inwardly into a locked fixed position underneath the truck 20 when the unloader 10 is not in use. Preferably, between six and twelve rollers 68 are coupled to the outside surface 40A of each distal edge 41 of the frame 40.

When positioning the frame 40 of the unloader 10 for the first time in a secure position integrated within the support platform 19, the rollers 68 of one of the distal edges 41 of the frame are placed into the front channel 66A of the automatic hydraulic mechanism 64. Next, the rollers 68 of the remaining distal edge 41 are locked into the back channel 66B. Positioning the unloader 10 in this manner tightly secures the rollers 68 into the channels 66 and thus prevents the unloader 10 from dislodging from underneath the body 22 of the dump truck 20.

In use, the rollers 68 are actuated by the automatic hydraulic mechanism 64. Preferably, the automatic hydraulic mechanism 64 has a hydraulic cylinder 75 powered by the hydraulic fluid system 32. Preferably, a pair of hydraulic lines 55 feed pressure from the hydraulic fluid system 32 of the dump truck 20 to the hydraulic cylinder 75 thus creating the required pressure to actuate the rollers 68. The hydraulic cylinder 75 is in electronic communication with an activation switch 77 located within the dump truck 20. To ready the unloader for use, the driver selectively pushes the activation switch causing the hydraulic cylinder 75 to actuate the rollers 68 to slide the unloader 10 outwardly from underneath the body 22 of the dump truck 20 along the channels 66. At, least two bumper stops 31 are positioned on the channels 66 to prevent the unloader 10 from extending past the bed 22 of the dump truck 20 and dislodging from the dump truck 20. The chain driven conveyor assembly 70 is then utilized to dump material from the bed of the dump truck 20 onto a dump site. Once all the material is dumped at the dump site, the driver selectively pushes the activation switch 77 causing the hydraulic cylinder 75 to actuate the rollers 68 and retract the unloader 10 safely and securely underneath the body 22 of the dump truck 20.

In addition, a plurality of cross-braces 48 extend between the flanges 44 of the frame 40 of the unloader 10 to further prevent the frame 40' from twisting or bending. The flanges 44 each include a V-shaped top 44A. An inclined side wall 50 is attachable to each flange 44 for catching excess material and properly funneling the material down the platform 42. A back plate 52 extends perpendicularly between each V-shaped top 44A of the flanges 44 for ensuring that material coming from the spout 30 is sent directly onto the platform 42.

The outside surface 40A of the frame 40 has at least two attaching brackets 54 and at least two handles 56 welded thereto for adjusting and positioning the unloader 10, as necessary. A pair of hooks 58 are welded to the V-shaped top 44A. A detachable bungee cord 60 is removably connected at ends 60A by S-hooks 62, one end 60A attached to one of the handles 56, the other end 60A attached to the truck 20 for stabilizing the frame 40 and preventing the frame 40 from swinging.

Figure 5:
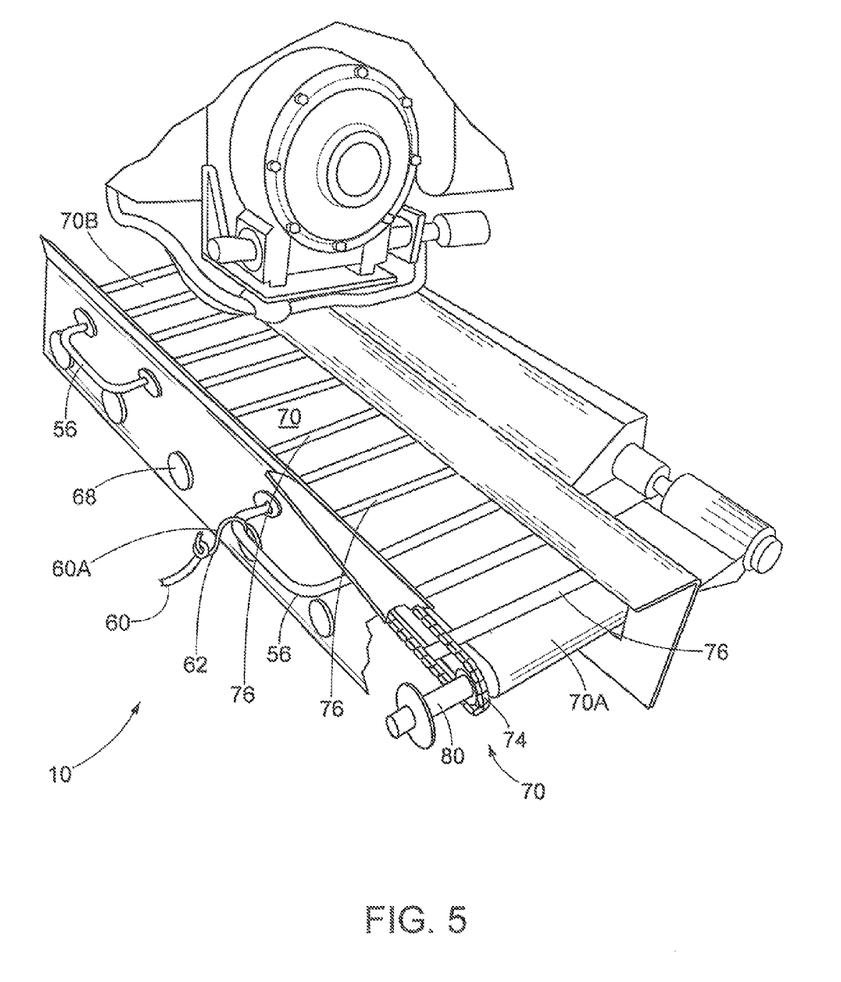
FIG. 5 is a diagrammatic prospective view of the automated material unloader of the present invention, having handles for lifting the unloader during mounting, a bungee cord for prevention of the unloader from swinging when in motion, and a stabilizing bracket to prevent bending or twisting of the frame.
Figure 7:
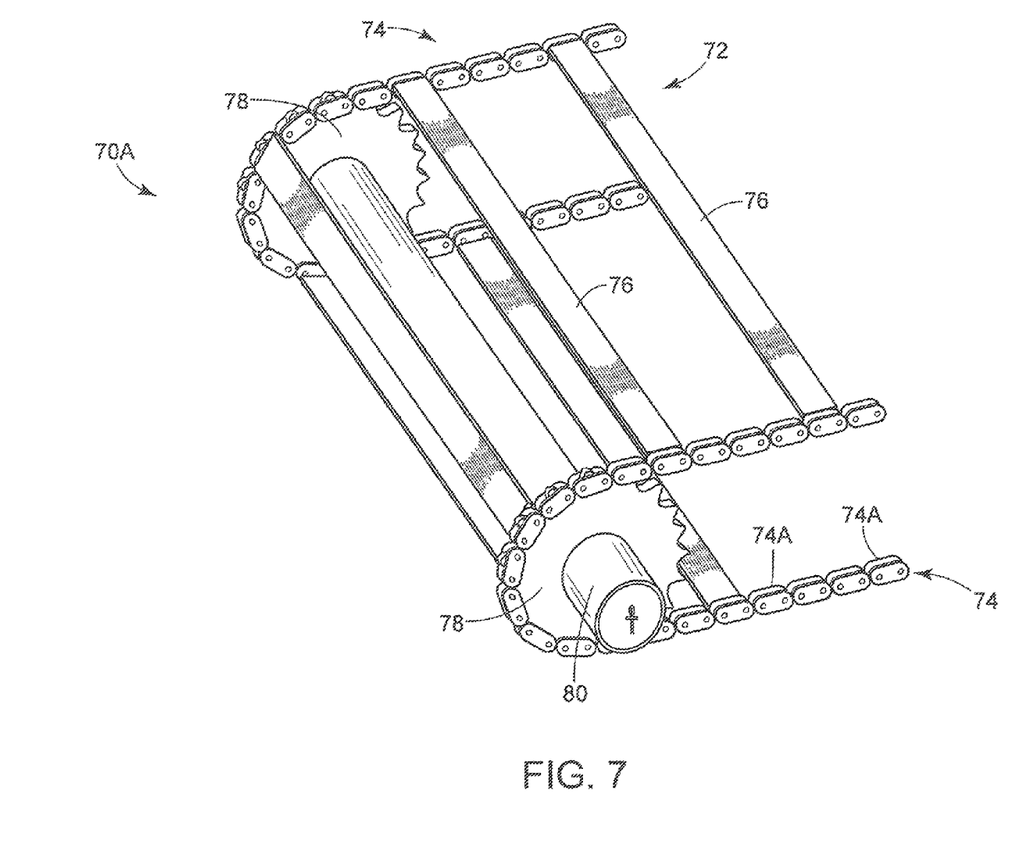
FIG. 7 is a diagrammatic perspective view of the endless drive mechanism of the automated material unloader of the present invention, having a pair of parallel drive chains connected together by a plurality of perpendicular bars.
Figure 8:
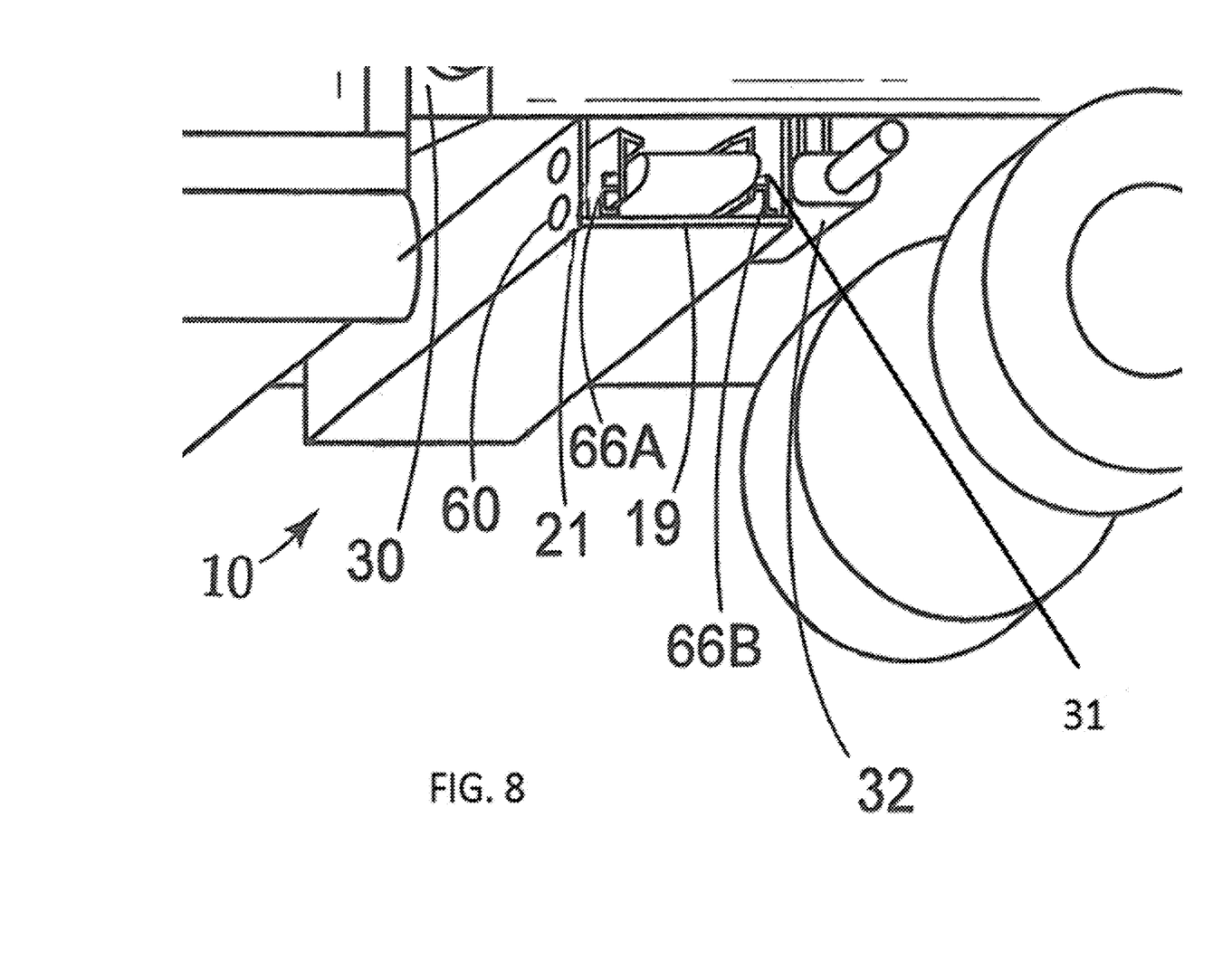
FIG. 8 is an exploded view of FIG. 1 showing a diagrammatic perspective view of an automated material unloader of the present invention secured underneath a dump truck.

In the preferred embodiment, material for dumping at a dump site is transported through the hole 28 of the dump truck 20, down the spout 30, and onto the platform 42. A chain driven conveyor assembly 70 then carries the material to the distal end 42A of the platform 42 and off the platform 42 onto the desired location. FIG. 5 illustrates the platform 42, wherein the platform 421 supports an endless drive mechanism 72 (shown in FIG. 7) as well as the chain driven conveyor assembly 70. Shown in FIG. 7, the drive mechanism 72 includes a pair of parallel drive chains 74 connected together by a plurality of perpendicular bars 76. The chain driven conveyor assembly 70 includes a lower end 70A and an upper end 70B. The lower end 70A is drivably located about a pair of drive sprockets 78. The sprockets 78 are secured to a transverse drive shaft 80. The upper end 70B is trained about tail or idler sprockets 82 mounted on a traverse shaft 84. Links 74A of the drive chain 74 loop over and catch the sprockets 78 and 82 which force the bars 76 to continually circle the platform 42 carrying and pushing material from the upper end 70B to the lower end 70A.

In the preferred embodiment, the power train 90 of the unloader 10 is powered by the hydraulic fluid system 32 of the dump truck 20. The power train 90 includes a hydraulic motor 92, a gearbox 94 and a driveshaft 96 connecting the motor to the gearbox. A pair of hydraulic lines 98 feed pressure from the hydraulic fluid system 32 of the dump truck 20 to the hydraulic motor 92. The attaching brackets 54 hold the hydraulic motor 92 and gearbox 94 adjacent to the conveyor assembly 70. In use, the gearbox 94 rotates and translates the rotation on an axis of 90 degrees to the transverse drive shaft 84.

Figure 4:
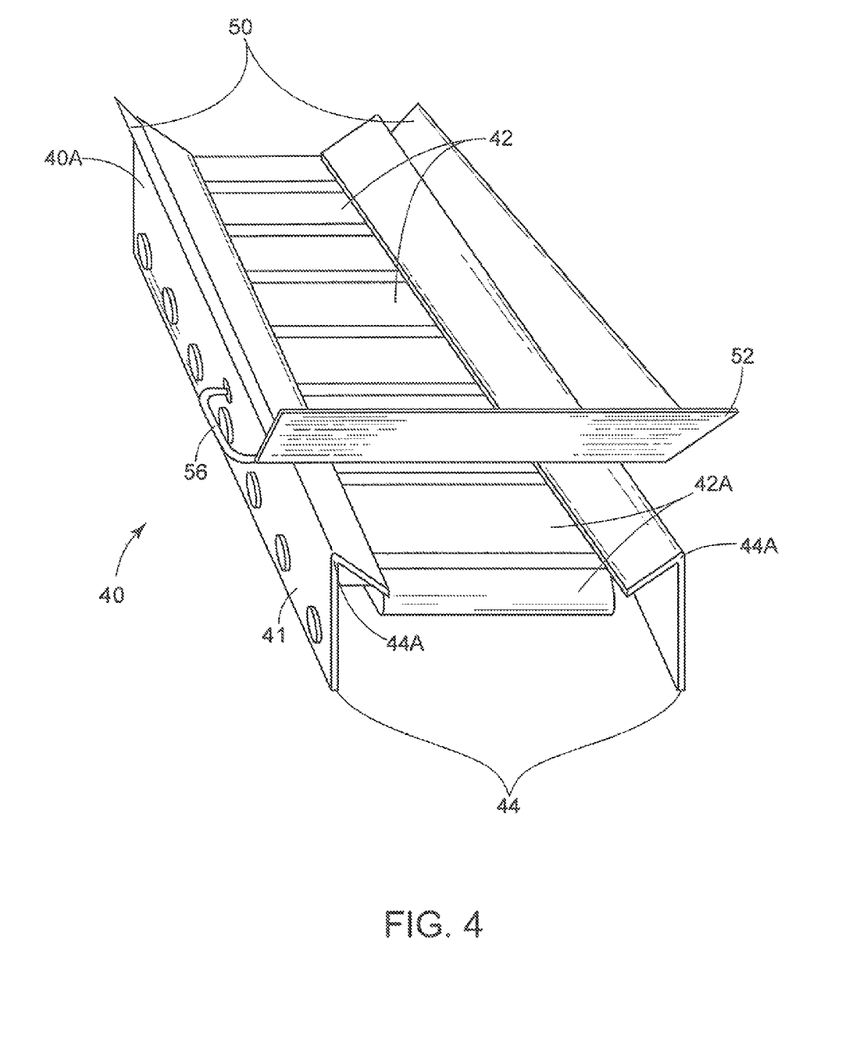
FIG. 4 is a diagrammatic perspective view of the automated material unloader of the present invention, having a back plate and inclined side walls to prevent excess material from falling off of the unloader during transport to the dump site.
Figure 6:
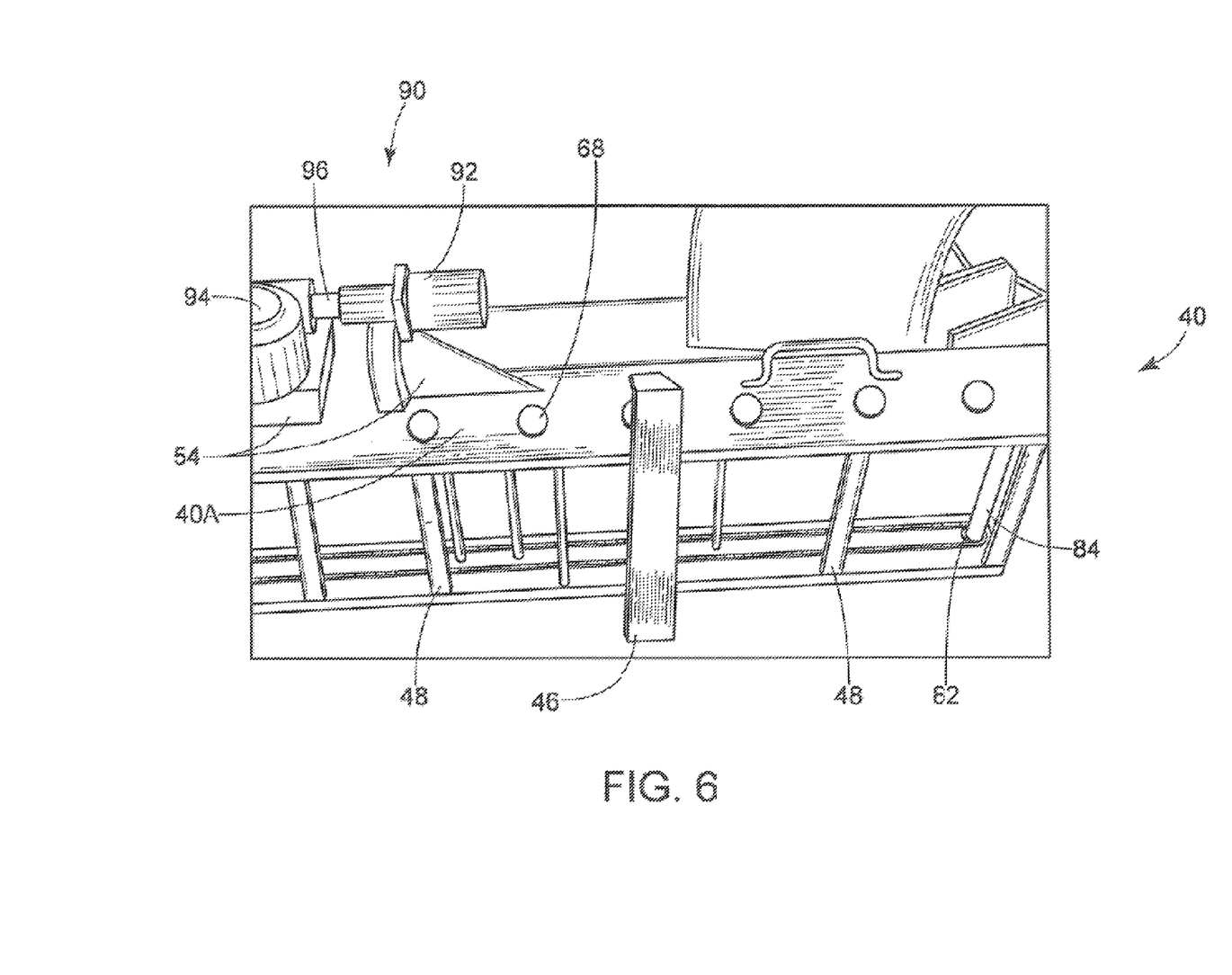
FIG. 6 is a diagrammatic prospective view of the automated material unloader of the present invention, having a plurality of cross-braces to prevent twisting or bending of the frame, attaching brackets to hold the hydraulic motor and gearbox onto the frame, and a tension adjustment mechanism to ensure that the drive mechanism is operating at optimum tension.

FIGS. 4 and 6 illustrate a tension adjustment mechanism 100 which is connected to the traverse drive shaft 84 and is used to ensure that the drive mechanism 72 is operating at optimum tension. The tension adjustment mechanism 100 can be selectively loosened or tightened as necessary.

In conclusion, herein is presented a side dump material unloader. The invention is illustrated by example in the drawing figures, and throughout the written description. It should be understood that numerous variations are possible, while adhering to the inventive concept. Such variations are contemplated as being a part of the present invention.

What is claimed is:

1. A material unloader for use on a dump truck having body, a bed having a front end and a back end, and a hydraulic fluid system, comprising:
   an automatic hydraulic mechanism powered by said hydraulic fluid system is supported underneath said body of said dump truck having a support platform having at least two channels and two coupling means, wherein the coupling means are vertical beams suspending said support platform underneath said body, wherein said channels include a front channel and back channel, wherein said front channel is a U-shaped channel and said back channel is a Z-shaped channel, where said front and back channels having bumper stops positioned thereon;
   a frame removably coupled to said channels, said frame having an outside surface having distal edges, wherein said distal edges have a plurality of rollers;
   said frame further comprising a platform having a distal end, a pair of longitudinal flanges coupled together by at least one perpendicular stabilizing bracket, a plurality of cross-braces extending between the flanges, wherein said flanges each including a V-shaped top, an inclined side wall attachable to each flange, a back plate extending perpendicularly between each V-shaped top of said flanges,
   said frame further comprising at least two attaching brackets coupled to the outside surface, at least two handles welded to the outside surface of said frame, a pair of hooks welded to the V-shaped top, a bungee cord having ends and removably connected at said ends by an S-hook, one end attaching to one of said handles and the other end attaching to the side of said truck;
   a chain driven conveyor assembly powered by said hydraulic fluid system carries said material along the platform, said platform supports an endless drive mechanism including a pair of parallel drive chains, connected together by a plurality of perpendicular bars, said chain driven conveyor assembly including a lower end and an upper end, said lower end drivably located about a pair of drive sprockets secured to a transverse drive shaft, said upper end trained about idler sprockets mounted on a traverse shaft, a tension adjustment mechanism connected to said traverse shaft; and
   a power train powered by said hydraulic fluid system of said dump truck, including a hydraulic motor, a gearbox and a driveshaft connecting said hydraulic motor to said gearbox, a pair of hydraulic lines feed pressure from the hydraulic fluid system to the hydraulic motor, said attaching brackets hold said hydraulic motor and gearbox adjacent to the chain driven conveyor assembly.

2. A material unloader for use on a dump truck having a body and a hydraulic fluid system, comprising:
   an automatic hydraulic mechanism powered by said hydraulic fluid system is supported underneath said body of said dump truck having a support platform having at least two channels and a coupling means, wherein said channels include a front channel and back channel;
   a frame removably coupled to said channels, said frame having an outside surface, having distal edges, wherein said distal edges have a plurality of rollers;
   a platform having a distal end, a pair of longitudinal flanges coupled together by at least one perpendicular stabilizing bracket, a plurality of cross-braces extending between the flanges, said flanges each including a V-shaped top, an inclined side wall attachable to each flange, a back plate extending perpendicularly between each V-shaped top of said flanges, at least two attaching brackets coupled to the outside surface of said frame, at least two handles welded to the outside surface of said frame, a pair of hooks welded to the V-shaped top, a bungee cord having ends and removably connected at said ends by an S-hook, one end attaching to one of said handles and the other end attaching to the side of said truck;
   a chain driven conveyor assembly powered by said hydraulic fluid mechanism carries said material along the platform, said platform supports an endless drive mechanism; and
   a power train powered by said hydraulic fluid system of said dump truck, including a hydraulic motor, a gearbox and a driveshaft connecting said hydraulic motor to said gearbox.

3. The material unloader of claim 2 wherein said front channel is a U-shaped channel and said back channel is a Z-shaped channel.

4. The material unloader of claim 3 where said front and back channels having bumper stops positioned thereon.

5. The material unloader of claim 3 wherein the coupling means includes at least vertical beams.

6. The material unloader of claim 5 further comprising, a plurality of cross-braces extending between the flanges.

7. The material unloader of claim 6, wherein said flanges each include a V-shaped top.

8. The material unloader of claim 7, further comprising an inclined side wall attachable to each said flange.

9. The material unloader of claim 8, further comprising a back plate extending perpendicularly between each V-shaped top of said flanges.

10. The material unloader of claim 9, further comprising at least two attaching brackets coupled to said outside surface of said frame.

11. The material unloader of claim 10, further comprising at least two handles welded to said outside surface of said frame.

12. The material unloader of claim 11, wherein the endless drive mechanism includes a pair of parallel drive chains, having links, connected together by a plurality of perpendicular bars.

13. The material unloader of claim 12, wherein said chain driven conveyor assembly includes a lower end and an upper end, said lower end drivably located about a pair of drive sprockets secured to a transverse drive shaft, said upper end trained about idler sprockets mounted on a traverse shaft.

14. The material unloader of claim 13, further comprising a pair of hydraulic lines feeding pressure from said hydraulic fluid system to said hydraulic motor.

15. The material unloader of claim 14, wherein said attaching brackets hold said hydraulic motor and gearbox adjacent to said chain driven conveyor assembly.

* * * * *